United States Patent
Su et al.

(10) Patent No.: US 10,216,963 B2
(45) Date of Patent: Feb. 26, 2019

(54) METHOD TO PROTECT AN IC LAYOUT

(71) Applicant: AnaGlobe Technology, Inc., Hsinchu (TW)

(72) Inventors: Yi-Jen Su, Hsinchu (TW); Chung-Cheng Lee, Hsinchu County (TW); Hung Yeh Chen, Hsinchu (TW)

(73) Assignee: AnaGlobe Technology, Inc., Hsinchu (TW)

(*) Notice: Subject to any disclaimer, the term of this patent is extended or adjusted under 35 U.S.C. 154(b) by 206 days.

(21) Appl. No.: 15/375,191

(22) Filed: Dec. 12, 2016

(65) Prior Publication Data
US 2018/0165477 A1    Jun. 14, 2018

(51) Int. Cl.
G06F 17/50 (2006.01)
G06F 21/72 (2013.01)
G06F 21/60 (2013.01)
G06F 21/64 (2013.01)

(52) U.S. Cl.
CPC .......... *G06F 21/72* (2013.01); *G06F 17/5068* (2013.01); *G06F 21/602* (2013.01); *G06F 21/64* (2013.01)

(58) Field of Classification Search
CPC .... G06F 21/72; G06F 17/5036; G06F 17/504; G06F 17/5045; G06F 21/602; G06F 2217/06; G06F 2217/12
See application file for complete search history.

(56) References Cited

U.S. PATENT DOCUMENTS

| | | | | |
|---|---|---|---|---|
| 5,428,685 A * | 6/1995 | Kadooka | ............... | G06F 21/602 705/51 |
| 6,308,256 B1 * | 10/2001 | Folmsbee | ........... | G06F 9/30145 712/208 |
| 6,598,166 B1 * | 7/2003 | Folmsbee | ............. | G06F 21/125 713/189 |
| 6,675,298 B1 * | 1/2004 | Folmsbee | ............... | G06F 21/75 712/E9.028 |
| 7,024,640 B2 * | 4/2006 | Buchanan | ........... | G06F 17/5022 716/112 |
| 7,222,321 B2 * | 5/2007 | Lin | ..................... | G06F 17/5068 716/122 |
| 7,353,400 B1 * | 4/2008 | Folmsbee | ............... | G06F 11/08 713/190 |
| 8,621,237 B1 * | 12/2013 | Bailey | ................... | G06F 21/602 713/189 |
| 8,910,303 B2 * | 12/2014 | Su | .......................... | G06F 21/51 705/59 |
| 9,223,912 B1 * | 12/2015 | Liapis | ................. | G06F 17/5081 |
| 9,635,011 B1 * | 4/2017 | Wu | ..................... | H04L 63/0807 |

(Continued)

*Primary Examiner* — Joseph P Hirl
*Assistant Examiner* — Stephen T Gundry
(74) *Attorney, Agent, or Firm* — Chih Feng Yeh; Huntington IP Consulting Co., Ltd.

(57) ABSTRACT

The method, executed by at least one processor of a computer, of an encrypting or a decrypting method for an IC layout is proposed. The encrypting method comprises getting a record of an IC layout object from a database. Data of the IC layout object is appended into a byte array. The byte array is encrypted into a second byte array. Each byte of the second byte array is defined as an encryption value to create multiple encryption values. Finally, an encryption object with multiple encryption values is created on a specified layer.

20 Claims, 7 Drawing Sheets

(56) References Cited

U.S. PATENT DOCUMENTS

| | | | |
|---|---|---|---|
| 2006/0259882 A1* | 11/2006 | Lin | G06F 17/5068 716/122 |
| 2007/0033406 A1* | 2/2007 | Hanaki | G06F 21/602 713/171 |
| 2008/0208886 A1* | 8/2008 | Zhang | G06F 21/6218 |
| 2008/0219441 A1* | 9/2008 | Asperger | G06F 21/71 380/46 |
| 2009/0222785 A1* | 9/2009 | Cheng | G06F 17/5036 716/55 |
| 2010/0082997 A1* | 4/2010 | Elbaum | G06F 21/51 713/180 |
| 2011/0154465 A1* | 6/2011 | Kuzin | H04L 63/0815 726/9 |
| 2012/0054498 A1* | 3/2012 | Rickman | G06F 21/606 713/183 |
| 2013/0298094 A1* | 11/2013 | Chen | G06F 17/5081 716/112 |
| 2013/0298262 A1* | 11/2013 | Su | G06F 21/76 726/34 |
| 2013/0305194 A1* | 11/2013 | Wang | G06F 17/5081 716/52 |
| 2014/0281559 A1* | 9/2014 | Trachtenberg | H04L 63/0457 713/178 |
| 2014/0340330 A1* | 11/2014 | Trachtenberg | G06F 1/1626 345/173 |
| 2015/0254477 A1* | 9/2015 | Matsumoto | G06F 21/602 713/193 |
| 2015/0347762 A1* | 12/2015 | Home | G06F 21/60 726/26 |
| 2016/0034694 A1* | 2/2016 | Rajendran | G09C 1/00 713/190 |
| 2016/0110486 A1* | 4/2016 | Kheterpal | G06F 17/505 716/101 |
| 2017/0111330 A1* | 4/2017 | Mosko | H04L 9/00 |
| 2017/0353297 A1* | 12/2017 | Joshi | G06F 12/1408 |
| 2018/0060561 A1* | 3/2018 | Pedersen | G06F 21/44 |

* cited by examiner

METHOD TO PROTECT AN IC LAYOUT

BACKGROUND OF THE INVENTION

Technical Field

The present invention relates to an integrated circuit (IC) layout, and more particularly, to a method for protecting an integrated circuit (IC) layout.

Description of Related Art

In general, the electronic circuit of an integrated circuit (IC) can be considered to be a graph of connected components such as transistors and resistors. Such an entity is commonly referred it as a netlist. Each component is mapped to one or more layout objects that are geometrical 2-dimensional objects such as, but not limited to, rectangles, polygons, and paths. In turn, these layout objects are used to define regions within the semiconductor die, which will receive different processing steps such as dopant, implants to produce N-type or P-type regions during the integrated circuit fabrication process.

Every layout object must satisfy manufacturing rules that specify geometrical requirements for each object as well as the relationship of an object to other objects. The manufacturing rules increase the probability that the final IC products will meet product specifications. Examples of such requirements include, but are not limited to, such items as minimum layout object width and minimum spacing from one layout object to that of another.

A circuit designer typically creates an IC design in the form of a netlist referencing circuit devices to be included in the IC and indicating which conductive net is to be connected to each device terminal. Design engineers typically use electronic design automation (EDA) applications to create IC layouts. These applications provide sets of computer-based tools for creating, editing, and analyzing IC design layouts. A digital IC designer usually processes a netlist description of an IC using a placement and routing (P&R) tool that automatically generates an IC layout indicating the position and orientation of each device within the IC and indicating how conductors forming nets interconnecting device terminals are to be routed within the IC. When generating a layout for a digital IC, the P&R tool treats each device as a separate cell having a predetermined internal layout. The tool iteratively repositions cells and reroutes nets until it arrives at a layout solution satisfying constraints on the size and aspect ratio of the available layout area, on signal path delays, on net widths and spacing, and on power density and other constraints.

EDA applications create layouts from an IC netlist by various operations. Some of the physical design (PD) operations need to transform a netlist to a layout include: (1) placement which specifies the location of the IC components; (2) routing which generates the layout objects used to connect the IC components; (3) addition operations to complete the layout such as adding substrate/well contacts and power/ground routing. The result of the physical design process is an IC layout.

Advanced and emerging IC processes cannot reliably print arbitrary geometric patterns because of complex interactions between neighboring features during the patterning processes.

The development flow for the intellectual property (IP) block can be as wide and varied as the end system in which it might be used. There are different types of models provided to customers for integration purposes. These vary from high-level code, to library models, to layout that must be integrated and tested in the target system. This leads to a protection problem. In order to use an IP block effectively, you must be able to implement and verify that the behavior is what you expected it to be. For example, a design team inserts a core and then verifies that it works correctly.

IP that is needed for verification can be protected in a relatively straight forward manner. The EDA tool reads the IP and then verifies the design. This approach can be used by the various physical and logic verification tools that are typically found in a design process. Tools like Verilog or Spice simulators currently support this capability today. An IP provider can deliver a model that is protected and can be used by the design team.

When merging in hard IP, often times there can be mismatched layer information, physical incompatibilities at the edges resulting in DRC errors and performance degradation once the IP is in context and routes are made over the top. The need and selection of IP is important. It is believed that integration costs for external IP can be 2× or 3× the cost of IP, without taking the risk of failure into account. Still, companies are compelled to license and use external IP and successfully protect it in the flow so that it does not lose its value. However, no one solution will fit the many ways that IP can be protected, developed, delivered, and designed in.

SUMMARY OF THE INVENTION

The invention has been described some embodiments. It should be noted that from the following discussion, alternative embodiments of the structures and methods disclosed herein will be readily recognized as viable alternatives that may be employed without departing from the principles discussed herein.

The present invention proposes a method, executed by at least one processor of a computer, of an encrypting method for an IC layout, comprising: getting a record of an IC layout object from a database; appending data of the IC layout object into a byte array; encrypting the byte array into a second byte array; defining each byte of the second byte array as an encryption value to create multiple encryption values; and creating an encryption object with multiple encryption values on a specified layer.

According to another aspect of the invention, the format of the IC layout object is generated by a specified pattern encoding program. The format of the IC layout object is binary format. The byte array is byte string in binary format.

According to one aspect of the invention, data of the IC layout object includes information of layer number and multiple two dimensional coordinates.

According to one aspect of the invention, the second byte array includes checking code for verification and encrypted byte string. The checking code is a debugging code, cyclic redundancy check (CRC) code or checksum code.

According to one aspect of the invention, the encryption value represents geometric data or layer of a memory. The encryption values include multiple values in first coordinate or in second coordinate. Each of the encryption values has and a value in first coordinate and a fixed offset in second coordinate. Each of the encryption values has and a value in second coordinate and a fixed offset in first coordinate.

According to one aspect of the invention, the encryption object is a path object. The encryption object has irregular shapes, regular shapes, texts with encoded string, properties with encoded string, or the combination thereof.

The present invention also proposes a method, executed by at least one processor of a computer, of a decrypting method for an IC layout, comprising: getting an encryption object on a specific layer from a database; appending the encryption object into a byte array; identifying a checking code and an encrypted byte array; decrypting the byte array into a second byte array, and followed by verifying with the checking code; identifying layer and coordinates of IC layout object; and reconstructing the original IC layout object.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
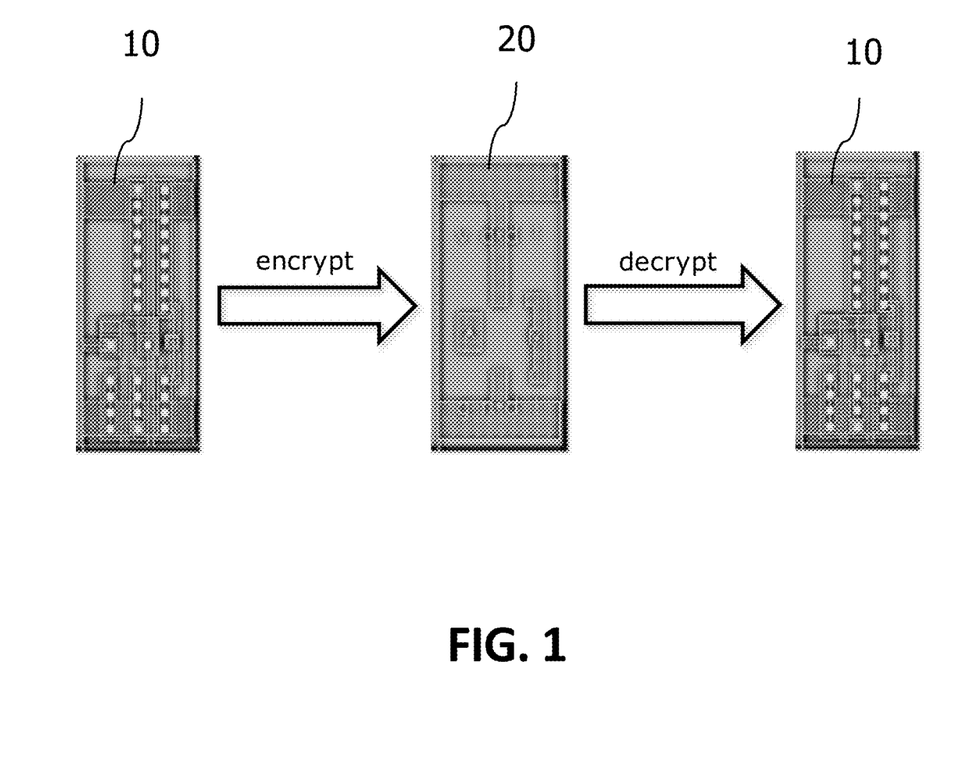
FIG. 1 illustrates an IP protection and reversion process of an integrated circuit (IC) layout of the invention.

FIG. 1 is an IP protection and reversion process of an integrated circuit (IC) layout of the invention. Referring to FIG. 1, this view of the indication number 10 is called a cell view. A cell can be a collection of placed geometric shapes. Each cell must have at least one layer. In design of the IC layout, each color represents a different layer within the cell. An integrated circuit can contain tens of thousands of unique cells and repeated instances of the same cell. The indication number 10 indicates a real IC layout. In the encryption stage, the real IC layout 10 is encrypted by a specified tool to form an encrypted IC layout 20 which hides the real IC layout but still provides essential information. That is, the IP protection of the real IC layout can be completed by the encrypting process for the real IC layout 10. In the decryption stage, the encrypted IC layout 20 can be decrypted by the specified tool to reverse as the original IC layout 10. Thus, the encrypted IC layout 20 can be reconstructed 100% the same as the original IC layout 10. The real IC layout 10 and the encrypted IC layout 20 can be loaded/saved by any tools. The encryption process and the decryption process may be performed by a computer or a computing device.

In the present invention, the encryption stage generates abstract cell with encrypted real layout embedded which can perform optional operations, e.g., flattening the hierarchy, removing properties, etc., and the decryption stage replaces the contents of abstract cell with decrypted data.

Figure 2:
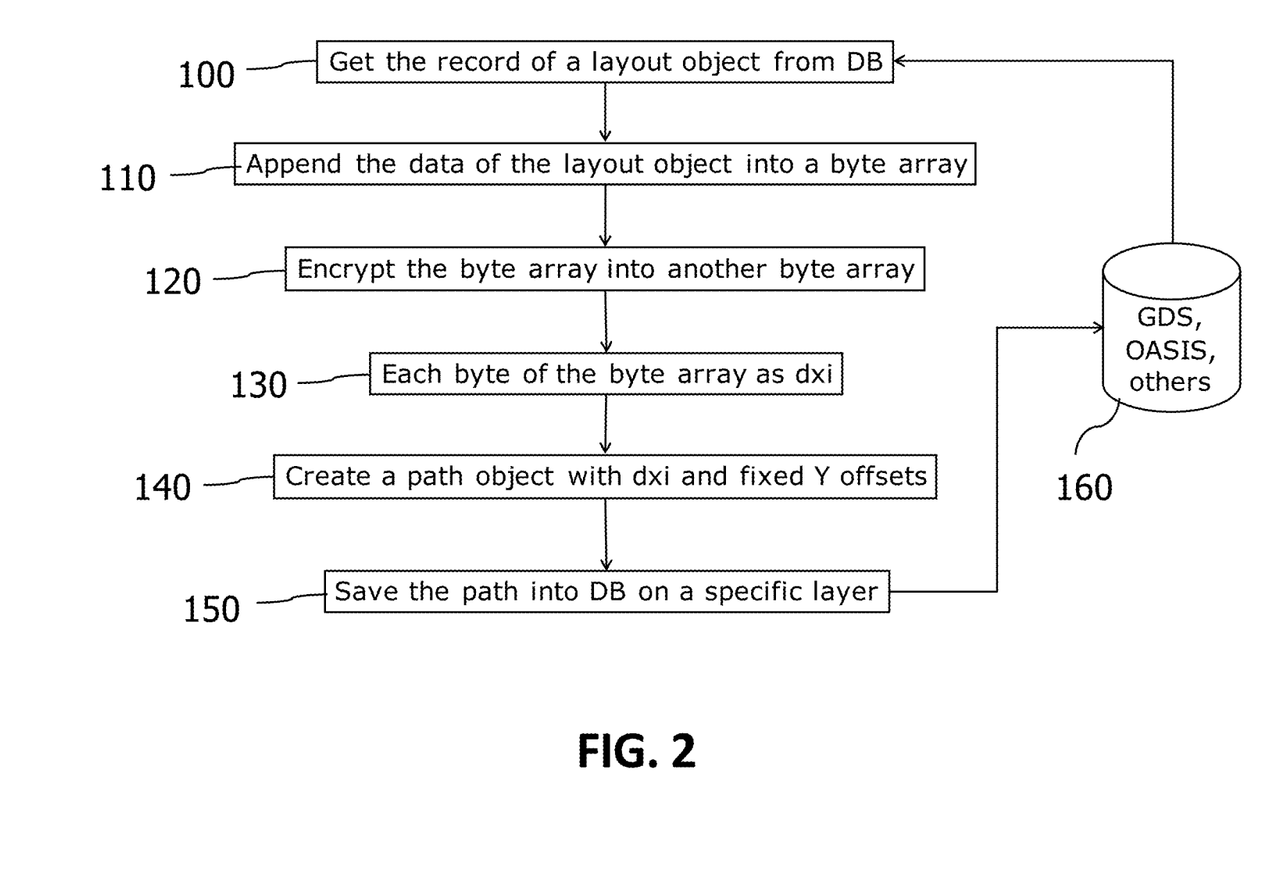
FIG. 2 illustrates a process flow diagram of an encrypting method for an IC layout in accordance with the invention.

Referring to FIG. 2, it shows a process flow diagram of an encrypting method for an IC layout in accordance with the invention. Firstly, in step 100, the record of an IC layout object is gotten from a database (DB) 160. The database 160 may be embedded in a computer. The format of IC layout object is generated by a specified pattern encoding program. The format of IC layout object is any binary format. For example, the format of IC layout object is Graphical Design System-II (GDS-II) stream format, OASIS format, or others standard format. The record defines the principal data division in an OASIS. A standard GDS-II stream IP tracking format allows a foundry to use a single tool to examine a chip database and obtain a report of all the IPs that are present and tagged as prescribed by this standard. GDS-II stream format is a database file format which is the de facto industry standard for data exchange of integrated circuit or IC layout artwork. GDS-II stream format is a binary file format representing planar geometric shapes, text labels, and other information about the layout in hierarchical form. The data can be used to reconstruct all or part of the artwork to be used in sharing layouts, transferring artwork between different tools, or creating photomasks. Open Artwork System Interchange Standard (OASIS) is used to represent and express an electronic pattern for an integrated circuit during its design and manufacture. The language of OASIS defines the code required for geometric shapes such as polygons, rectangles, trapezoids, path, circle, etc. with inherent attributes of layer and datatype. It defines the type of properties each can have, how they can be organized into cells containing patterns made by these shapes and defines how each can be placed relative to each other. The property defines an annotation element consisting of a name plus an optional list of values, supplying descriptive information about the characteristic of the file or one of its components. Each cell in the OASIS file can be independently compressed by the gzip-like algorithm. The cell defines a named object in a layout hierarchy, containing native geometric information, annotation information, and/or placement of other cells. The placement defines a specification by reference that a copy of a cell is to be placed within the coordinate space of another cell at a particular location, orientation, and scale. Cell placement is the fundamental mechanism which make hierarchy within the OASIS file possible.

Each line of the OASIS representation contains (from the left) a record number and a record type followed by a set of values that define that record type. For instance, the first rectangle record below defines the following type of rectangle shape, its size and its absolute location: layer, datatype, width, height, lower-left x-coordinate and lower-left y-coordinate. An OASIS file is a sequence of bytes divided into records. The length of a record is discernible from its structure and is not explicit (in contrast to GDS-II Stream, where all record lengths are explicit). An OASIS file may represent a complete layout hierarchy, or multiple layout hierarchies.

Figure 3:
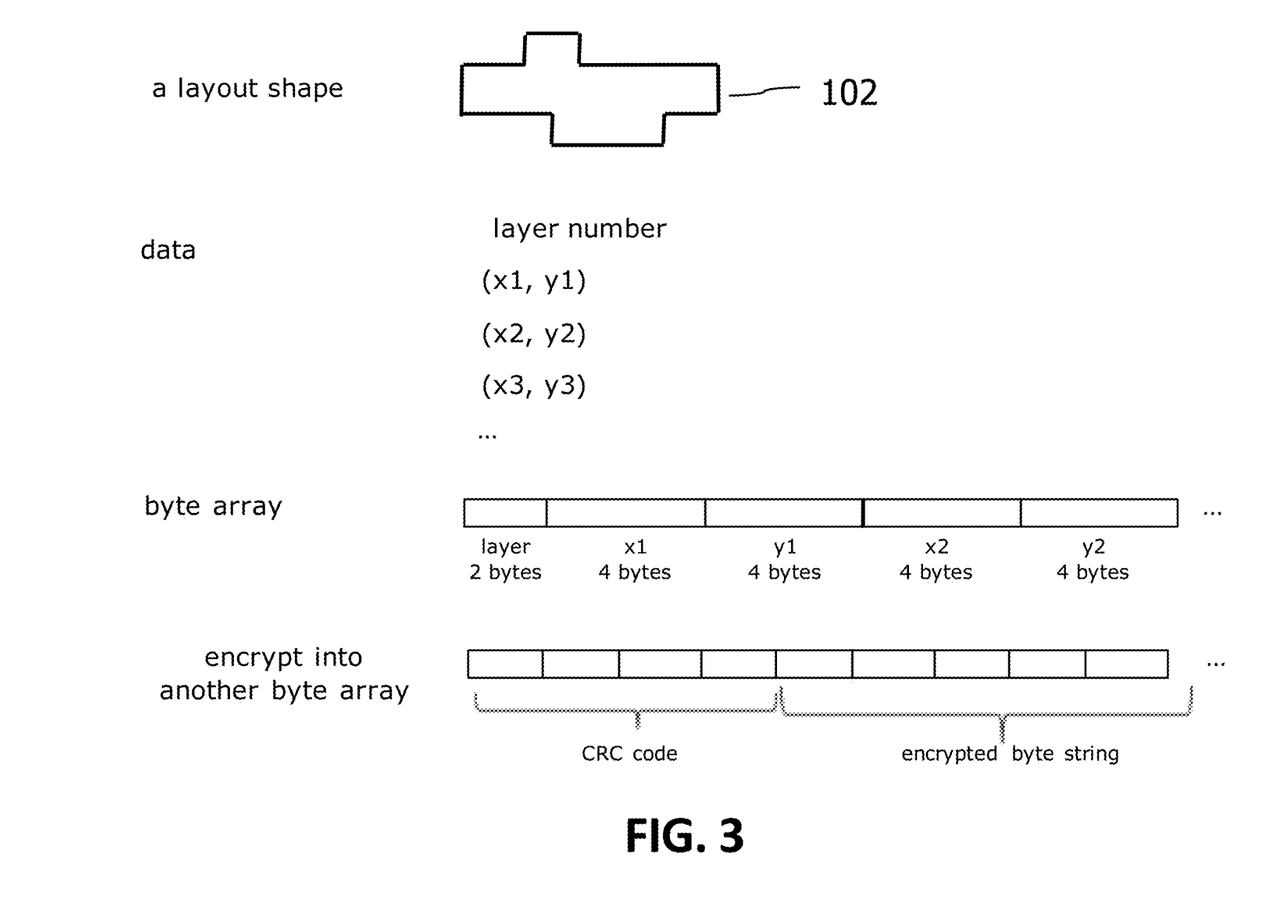
FIG. 3 illustrates encrypting processes of an IC layout in accordance with the invention.

Next, in step 110, the data of the IC layout object is appended into a byte array. For example, a layout shape 102 of the real IC layout is shown in FIG. 3. The IC layout object is created in two dimensional coordinates (X-Y orthogonal space). The data of the IC layout object includes information of layer number, and multiple two dimensional coordinates (x1, y1), (x2, y2), (x3, y3) . . . of the IC layout object. A byte is a fixed-length 8-bit value. Therefore, the data of the IC layout object is appended into a byte array, shown in FIG. 3. Byte array is byte string in binary format, such as the OASIS format. The layer occupied 2 bytes (16 bit value) appears on the first block of the byte array, the latter blocks of the byte array follows the same byte-continuous scheme. The same byte-continuous scheme describes that the coordinate x1, and the coordinate y1, the coordinate x2, the coordinate y2, the coordinate x3, the coordinate y3, . . . , each occupied 4 bytes (32 bit value), appears on the second block, third block, fourth block, . . . , of the byte array, respectively.

Subsequently, in step 120, the byte array is encrypted into an encrypted byte array. In one embodiment, the encrypted byte array includes checking code for verification and encrypted byte string. The checking code is for example a debugging code, cyclic redundancy check (CRC) code or checksum code. The CRC code may correspond to layer or the target address of the memory to determine whether the layer or the target address error has occurred.

Figure 4:
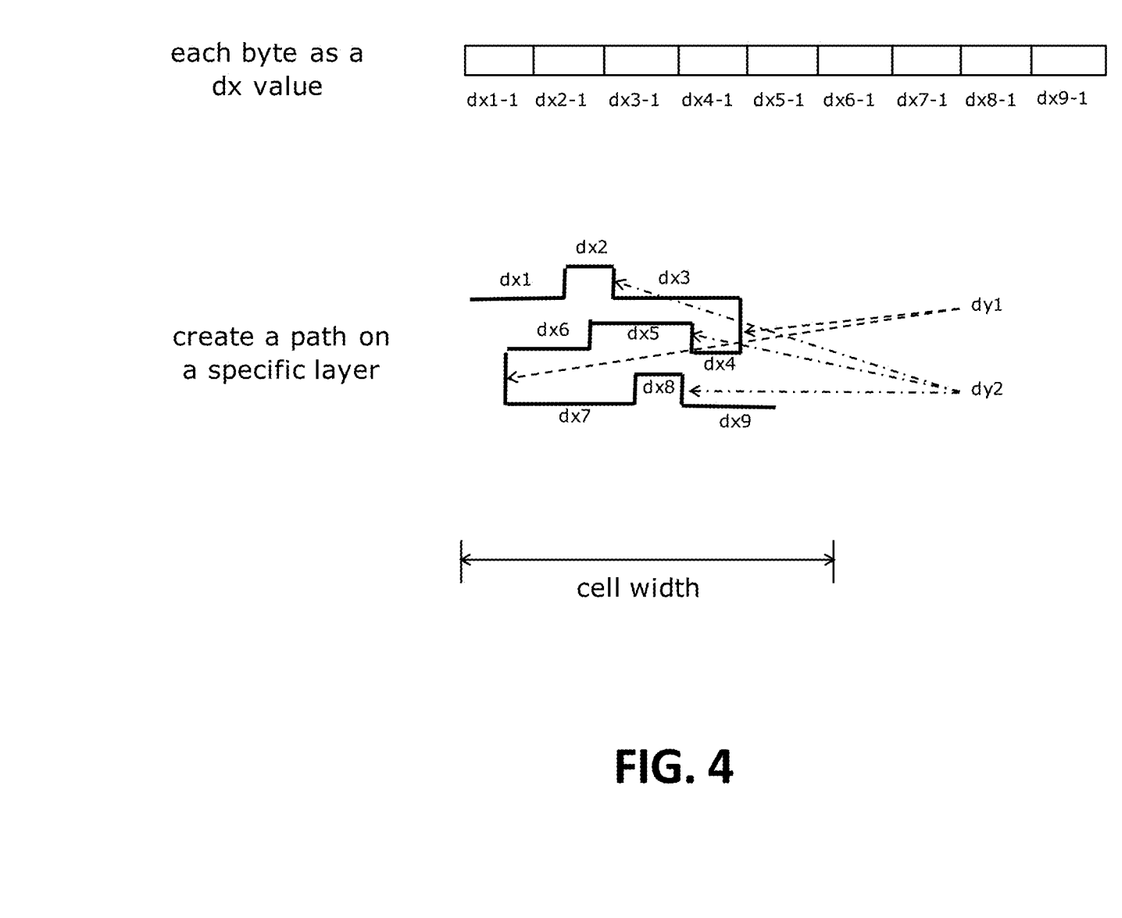
FIG. 4 illustrates encrypting processes of an IC layout in accordance with the invention.

In the following, in the step 130, each byte of the encrypted byte array is defined as a delta value, shown in FIG. 4. In one embodiment, the delta value represents geometric data (coordinates, vectors, planar offsets, etc.) or layer of the memory. For example, the delta values include multiple dx values in first coordinate containing of dxi-1, dx2-1, dx3-1, dx4-1, dx5-1, dx-6-1, dx7-1, dx8-1, dx9-1, . . . which are sequentially locating on the encrypted byte array. In another embodiment, the delta values include multiple dy values in second coordinate sequentially locating on the encrypted byte array.

In the next step 140, a path object with the delta values is created on a specified layer. In this embodiment, each of the delta values has and a dxi value and a fixed Y offset. The path is created in two dimensional coordinates (X-Y orthogonal space). As shown in FIG. 4, information of the delta value 1 includes dx1 and fixed Y offset (dy2), the delta value 1 includes dx1 and fixed Y offset (dy2), the delta value 2 includes dx2 and fixed Y offset (dy2), the delta value 3 includes dx3 and fixed Y offset (dy1), the delta value 4 includes dx4 and fixed Y offset (dy2), the delta value 5 includes dx5 and fixed Y offset (dy2), the delta value 6 includes dx6 and fixed Y offset (dy1), the delta value 7 includes dx7 and fixed Y offset (dy2), the delta value 8 includes dx8 and fixed Y offset (dy2), and the delta value 9 includes dx9, respectively. The path object is confined within the cell width. In this embodiment, it utilizes the path for recording (saving) the encoded (encrypted) byte array. In another embodiment, polygon may be used for recording (saving) the encoded (encrypted) byte array. In another embodiment, each one of the delta values has and a dyi value and a fixed X offset.

Figure 5:
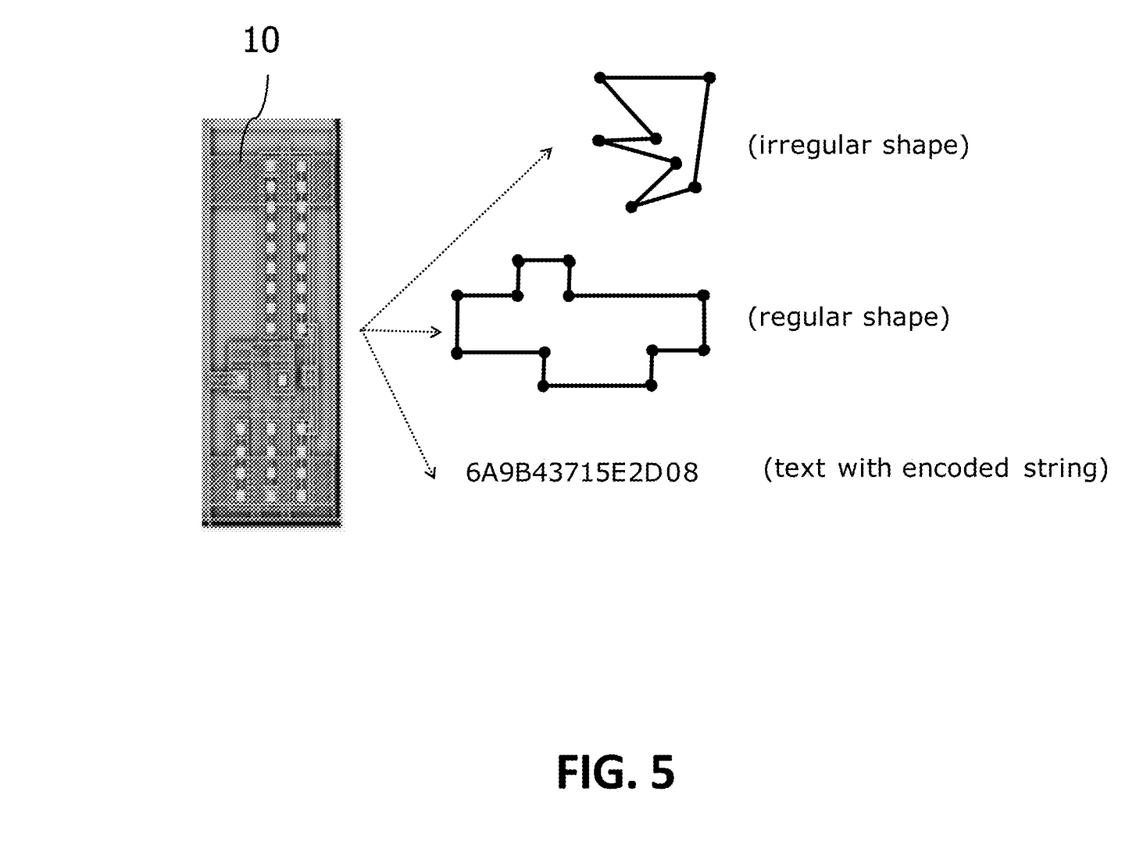
FIG. 5 illustrates alternatives of layout encryption for an IC layout in accordance with the invention.

As noted above, the IC layout object is appended into a byte array and encrypted into an encrypted byte array. Alternatives of layout encryption may include many different types, such as moving all layout objects into a specific layer and converting the objects into: irregular shapes (encode data into offsets), regular shapes (encode data into offsets), texts with encoded string, properties with encoded string, or the combination thereof, shown in FIG. 5.

In the present invention, a path is suitably used to store encrypted data. Each layout object can be converted into OASIS like byte array. The byte array is encrypted into another byte array, with CRC or checksum code. The path is created for the encrypted byte array. The path with encrypted data as X or Y offsets (depend on which direction has more space), other direction only shift a small value. The offset of each segment of the path is one byte (value 1~256) of the byte array. It needs header of object id+segment id, in case of huge number of points (need to store in more than one paths) exceeds limit. If there is no space, the text or property can be used.

Finally, in the step 150, the path is saved into the DB 160 on the specific layer. That is, the pass record is stored into the DB 160.

Figure 6:
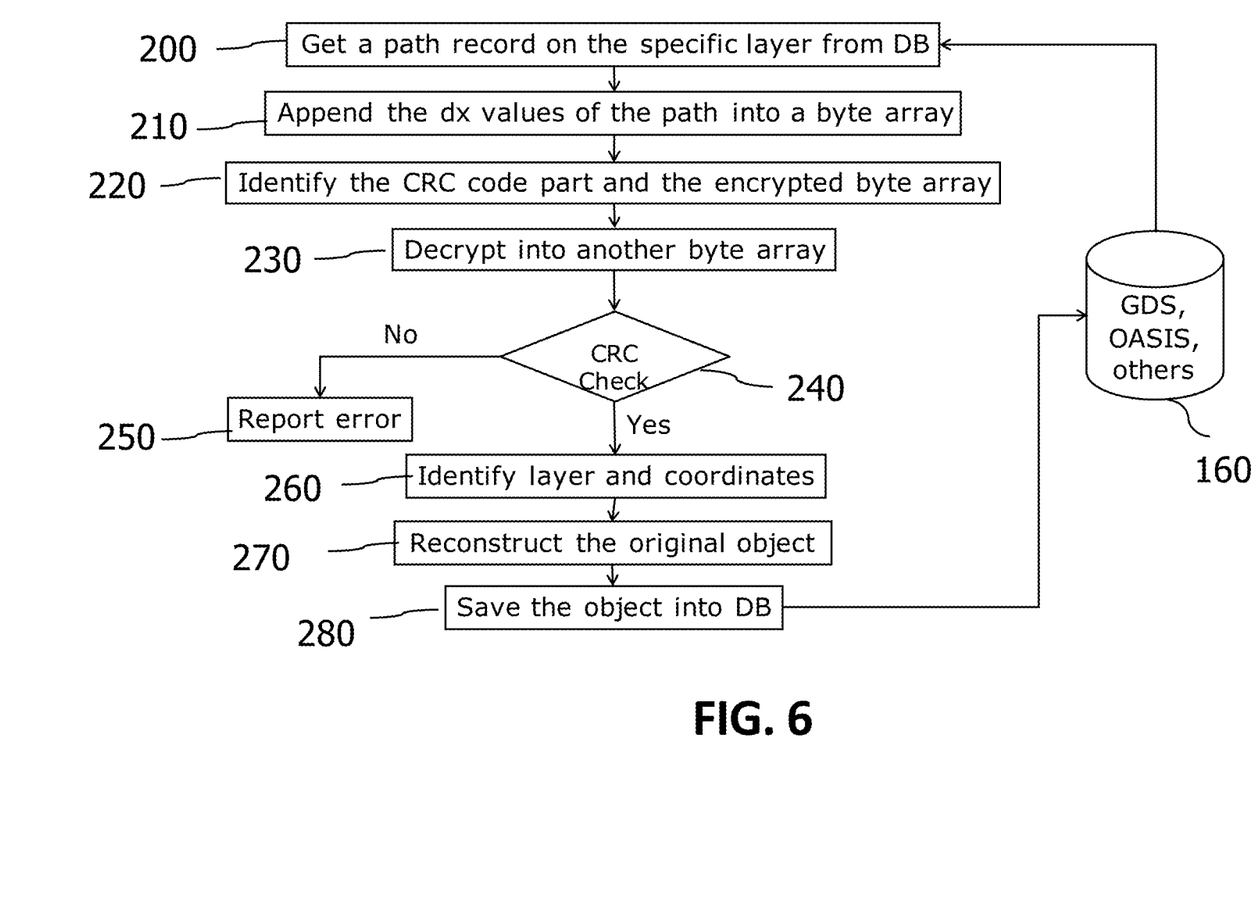
FIG. 6 illustrates a process flow diagram of a decrypting method for an IC layout in accordance with the invention.
Figure 7:
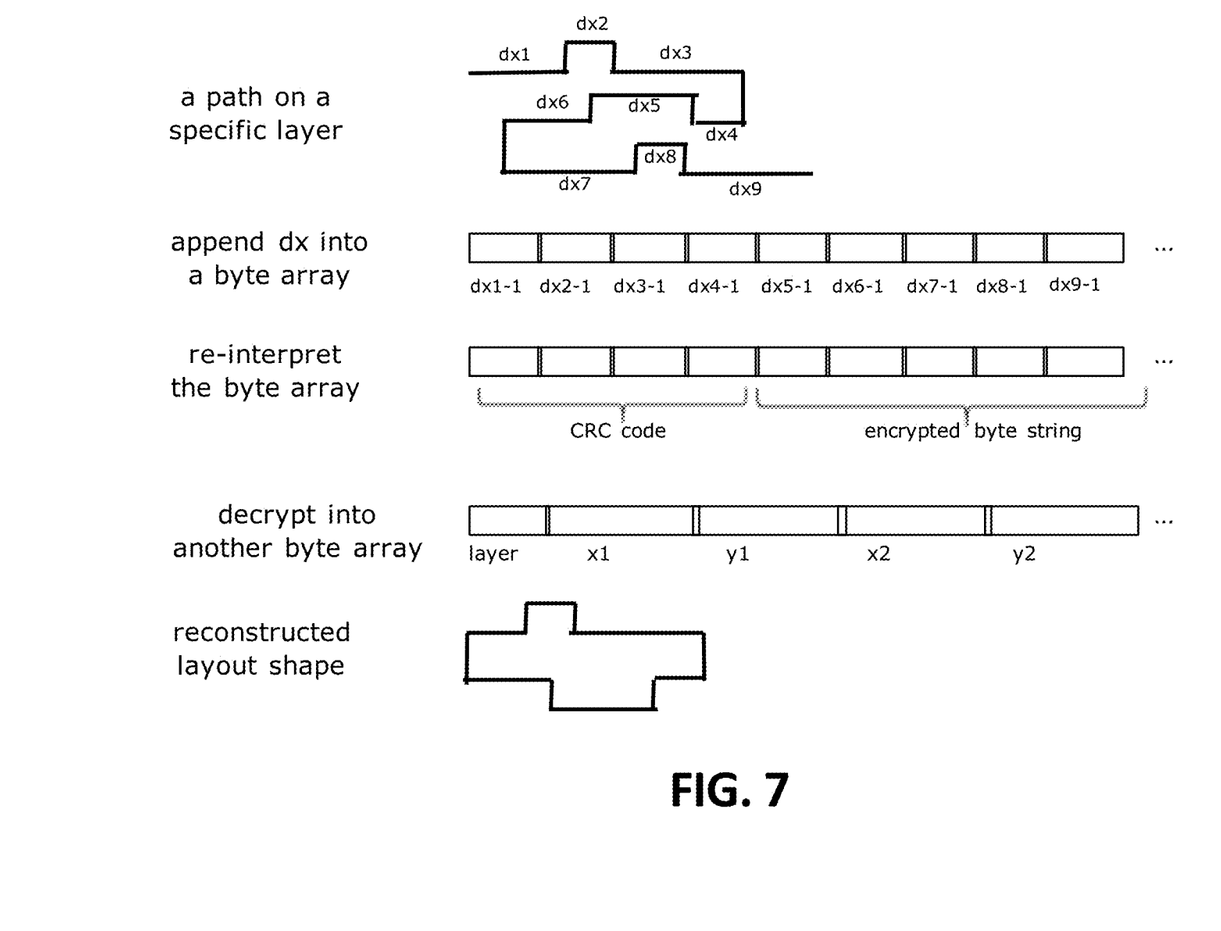
FIG. 7 illustrates decrypting processes of an IC layout in accordance with the invention.

Referring to FIG. 6, it shows a process flow diagram of a decrypting method for an encrypted IC layout in accordance with the invention. Firstly, in step 200, a path record on the specific layer is gotten from the database (DB) 160. Next, in the step 210, the delta values of the path record are appended into a byte array. Subsequently, in the step 220, the checking code (CRC or checksum code part) and the encrypted byte array are identified by a re-interpreting byte array process. Then, in the step 230, the byte array is decrypted into another byte array, and followed by verifying with CRC code, in the step 240. If the check is affirmative, forward to the step 260. If the check is affirmative, forward to the step 250 for reporting error. In the step 260, layer and coordinates of the layout are identified. In the next step 270, the original layout object is reconstructed. Therefore, the layout shape is reconstructed. Finally, in the step 280, the layout object is saved into the DB 160. That is, the layout object is stored into the DB 160. The above processes of decrypting can be realized by accompanying with FIG. 7.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method, executed by at least one processor of a computer, of an encrypting method for an IC layout, comprising:
   getting a record of an IC layout object from a database;
   appending data of said IC layout object into a byte array;
   encrypting said byte array into an encrypted second byte array with multiple encryption values, wherein each byte of said encrypted second byte array corresponds to an encryption value of said multiple encryption values, wherein said encryption value is represented by a delta value of a first coordinate and an offset value of a second coordinate; and
   creating an encrypted path object by said multiple encryption values to record said encrypted second byte array on a specified layer.

2. The method as set forth in claim 1, wherein format of said IC layout object is generated by a specified pattern encoding program.

3. The method as set forth in claim 2, wherein said format of said IC layout object is binary format.

4. The method as set forth in claim 1, wherein said byte array is byte string in binary format.

5. The method as set forth in claim 1, wherein data of said IC layout object includes information of layer number and multiple two dimensional coordinates.

6. The method as set forth in claim 1, wherein said second byte array includes checking code for verification and encrypted byte string.

7. The method as set forth in claim 6, wherein said checking code is a debugging code, cyclic redundancy check (CRC) code or checksum code.

8. The method as set forth in claim 1, wherein said encrypted path object represents a geometric shape.

9. The method as set forth in claim 1, wherein said first coordinate and said second coordinate is in a two dimensional orthogonal space.

10. The method as set forth in claim 9, wherein said encrypted path object represents a geometric shape.

11. The method as set forth in claim 1, further comprising saving said encrypted path object in said database.

12. The method as set forth in claim 11, wherein said encrypted path object represents a geometric shape.

13. The method as set forth in claim 1, wherein said encrypted path object further comprises texts with encoded string or properties with encoded string.

14. A method, executed by at least one processor of a computer, of a decrypting method for an IC layout, comprising:

getting an encrypted path object on a specific layer from a database, wherein said encrypted path object is created by multiple encryption values, wherein each byte of an encrypted byte array corresponds to an encryption value of said multiple encryption values, wherein said encryption value is represented by a delta value of a first coordinate and an offset value of a second coordinate;

appending said encrypted path object into a byte array;
identifying a checking code and said encrypted byte array;
decrypting said byte array into a second byte array, and followed by verifying with said checking code;
identifying layer and coordinates of IC layout object; and
reconstructing original said IC layout object.

15. The method as set forth in claim 14, wherein data of said IC layout object includes information of layer number and multiple two dimensional coordinates.

16. The method as set forth in claim 14, wherein said second byte array includes said checking code for verification and encrypted byte string.

17. The method as set forth in claim 14, wherein said checking code is a debugging code, cyclic redundancy check (CRC) code or checksum code.

18. The method as set forth in claim 14, wherein said encrypted path object represents a geometric shape.

19. The method as set forth in claim 14, wherein said encrypted path object further comprises texts with encoded string or properties with encoded string.

20. The method as set forth in claim 14, further comprising saving said IC layout object in said database.

* * * * *